United States Patent [19] [11] 3,935,683
Derner et al. [45] Feb. 3, 1976

[54] MULTIPANE WINDOW STRUCTURE

[75] Inventors: Paul Derner, Gelsenkirchen; Paul Weigt, Oberhausen, both of Germany

[73] Assignee: Flachglas Aktiengesellschaft Delog-Detag, Gelsenkirchen, Germany

[22] Filed: Nov. 7, 1973

[21] Appl. No.: 413,525

[30] Foreign Application Priority Data
Nov. 7, 1972 Germany............................ 2254426
Dec. 19, 1972 Germany............................ 2262040

[52] U.S. Cl. .................. 52/172; 52/399; 52/616
[51] Int. Cl.² ........................................... E06B 7/12
[58] Field of Search ............ 52/398, 172, 399, 616, 52/172

[56] References Cited
UNITED STATES PATENTS

| | | | |
|---|---|---|---|
| 1,224,530 | 5/1917 | Goetzke | 52/616 |
| 2,014,830 | 9/1935 | Ahrens | 52/172 |
| 2,038,725 | 4/1936 | Fox | 52/616 |
| 2,379,194 | 6/1945 | Shonts | 52/616 |
| 2,401,552 | 6/1946 | Cox | 52/616 |
| 2,525,717 | 10/1950 | Ottenheimer | 52/399 |
| 3,203,053 | 8/1965 | Lane | 52/398 |
| 3,226,903 | 1/1966 | Lillethan | 52/616 |
| 3,343,317 | 9/1967 | Cripe | 52/616 |
| 3,733,237 | 5/1973 | Wolff | 52/172 |
| 3,758,996 | 9/1973 | Bowser | 52/172 |
| 3,775,914 | 12/1973 | Patil | 52/616 |
| 3,783,084 | 1/1974 | Quenett | 52/616 |

FOREIGN PATENTS OR APPLICATIONS

| | | | |
|---|---|---|---|
| 564,321 | 10/1958 | Canada | 52/616 |
| 612,560 | 1/1961 | Canada | 52/616 |
| 74,440 | 12/1960 | France | 52/616 |

Primary Examiner—Frank L. Abbott
Assistant Examiner—Henry Raduazo
Attorney, Agent, or Firm—Karl F. Ross; Herbert Dubno

[57] ABSTRACT

An acoustically and thermally insulated window structure comprising two outer panes and at least one inner pane with an outer spacer interposed between the outer panes and at least one further spacer defining a gap between inner panes when a plurality of the latter are provided. One of the inner panes is spaced at a predetermined relatively small distance from a corresponding outer pane and a body of moisture-absorbent material is disposed in fluid communication with a space within the inner panes.

4 Claims, 4 Drawing Figures

MULTIPANE WINDOW STRUCTURE

FIELD OF THE INVENTION

The present invention relates to acoustically and thermally insulated windows of the multipane type wherein at least two panes are separated by a spacer structure and define a chamber in which at least one additional pane is disposed.

BACKGROUND OF THE INVENTION

Double-pane window structures have been proposed in a variety of constructions for acoustic and thermal installation purposes. Such structures have generally comprised two glass panes held in a predetermined spaced relationship by frame-like or other spacer structures extending around the peripheries of the panes and defining the peripheral edges of the window. The double-pane structure has an evacuated or gas-containing space between the sheets of glass while the frame is of low thermal conductivity so that conduction through the window of heat and sound is minimized.

It has been proposed to provide one or both of the panes in such structures of double-sheet construction whereby the window may consist of a pair of outer panes or glass sheets and at least one inner pane or glass sheet received between the outer panes.

In a preferred construction, a pair of inner glass sheets or panes is provided between the outer panes and complex structures are employed to space the several panes apart. For example, in prior-art systems and in the present system, it is desirable to provide a pair of inner panes or glass sheets having a relatively large spacing of, say 5 to 25 mm and a pair of outer glass sheets or panes, flanking the inner panes and spaced from the respective inner panes by relatively small distances of, say 0.3 to 2.0 mm, preferably 0.5 mm.

To assemble these window structures, it has been proposed to provide an outer spacer defining the distance between the outer panes and a pair of inner spacers individually inserted to space each inner pane from the proximal outer pane. These systems are complex to assemble and frequently do not provide satisfactory positioning of the panes relative to one another. For example, the spacing between the inner panes may not be adequately fixed.

OBJECTS OF THE INVENTION

It is, therefore, the principal object of the present invention to provide an improved multipane window construction in which the aforementioned disadvantages are obviated.

Another object of the invention is to provide a window construction, having a pair of spaced-apart outer panes and at least one, but preferably two inner panes, in which the interpane spacing is conveniently and accurately established.

Still another object of the invention is to provide a multipane window assembly of low cost and high insulating effectiveness for acoustical and thermal purposes.

SUMMARY OF THE INVENTION

These objects and other which will become apparent hereinafter are attained, in accordance with the present invention, in a multipane window construction that comprises at least three and preferably four panes or sheets of glass, including two outer panes and at least one but preferably two inner panes and a spacer between the outer panes. According to the present invention, an inner spacer is provided as well for retaining the or both of the inner panes in spaced relation to the outer pane and is interposed between the inner pane and the proximal outer pane. Advantageously, the wrap can be an adhesive band bonding the inner panes to the inner spacer and further bonding the inner panes to the outer panes.

In this concept, the thickness of the wrapping band can correspond to the predetermined spacing between the proximal inner and outer panes so that the wrapping member fulfills a double function. On the one hand, the tape or band is interposed between the inner pane or panes and the outer pane to establish the desired spacing between them and, on the other hand, the band or tape extends around the periphery of the inner pane or panes and the inner spacer to secure them together.

Preferably, the inner spacer is porous, perforated or otherwise permeable to water vapor so that the space between the inner panes or the space between each inner pane and the proximal outer pane is not sealed in the region of the periphery of the inner pane or in the region of the inner spacer but is only effected by the outer spacer.

The inner spacer can be composed of glass-fiber-containing or fiber glass reinforced synthetic resin, e.g. an epoxy, from polyurethane foam or from polyvinyl chloride. When the inner spacer consists of polyurethane foam, it has been found to be advantageous to provide it with a coating preventing deterioration by ultraviolet radiation, e.g. with a film of lacquer.

The outer spacer can be composed of metal, a synthetic resin such as polyvinyl chloride, or a metal-coated synthetic resin, preferably polyvinyl chloride clad with aluminum foil.

In accordance with the first aspect of the invention, moreover, the outer spacer is constituted as a hollow profile having its side turned toward the inner spacer provided with openings or otherwise made moisture permeable. Within the interior of the outer spacer, a drying agent may be provided for removing moisture from the spaces between the inner panes and the spaces between each inner pane and the outer pane. A suitable moisture-absorbing material is calcium chloride.

Advantageously, the predetermined spacing between the outer panes is established by the width of the outer spacer. However, it has been found to be advantageous in some instances to set back the flanks of the outer spacer from the confronting inner faces of the outer panes whereby the width of the outer spacer is made smaller than the outer dimension of the wrapping strip, tape or channel. The free space between the outer spacer and the outer panes, therefore, may be filled with an adhesive or sealing material.

According to another aspect of the invention, the inner spacer and the outer spacer form a unitary profile member. In this case, individual spacer portions of the unitary spacer bridge each outer pane and the proximal inner pane.

This system has an advantage in that, by comparison with more complex window structures, only a single spacer body is required and a saving is achieved in that separate production of inner and outer spacers is not necessary. Furthermore, the system can be assembled more readily than the plural-spacer arrangements.

In this concept, the spacer profile is preferably composed of a synthetic resin such as polyvinyl chloride and, in general, fiber glass containing or fiber glass reinforced synthetic resins may be used. However, the spacer profile may be constituted of metal-clad synthetic resin, preferably aluminum-coated polyvinyl chloride. The profile may be made entirely of metal as well.

The spacer profile is preferably made hollow and is moisture permeable on its side turned toward the spacers between the glass pane while it is moisture impermeable along the side forming the outer edge of the window structure. A drying agent is here also introduced into the hollow spacer profile.

Between the outer pane and the outer spacer and the inner pane proximal thereto the spacer profile has the configuration of an "h", the legs of which flank the edges of the inner pane and which establish the spacing between this inner pane and the proximal outer pane. Between the outer pane and the outer spacer an adhesive may be provided and it has been found to be advantageous to incline the outer flanks of the spacer away from the confronting faces of the outer panes to allow an adhesive to be accommodated as previously suggested.

The spacer profile at its surface turned toward the space between the inner panes may be formed with ridges, profiles or webs to further increase the acoustic-absorbing properties of the system.

In both of the configurations described, the outer pane and the inner pane proximal thereto may sandwich a transparent sound-absorbing synthetic resin layer between them.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
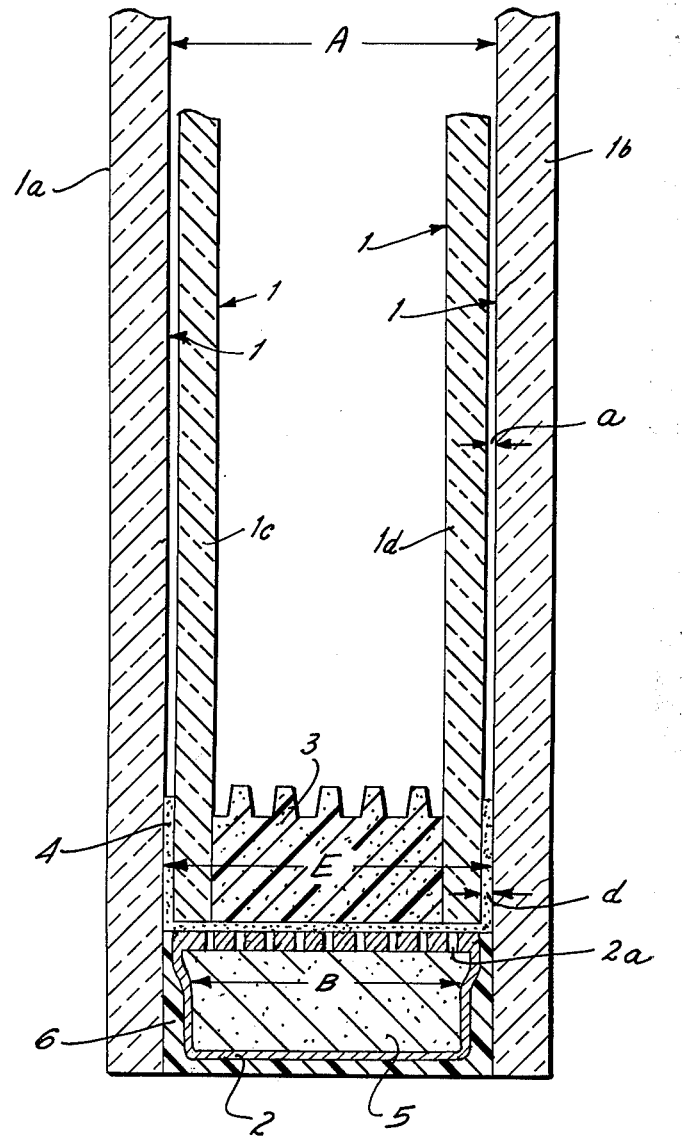
FIG. 1 is a cross-sectional view through a multipane window according to one embodiment of the invention.

In FIG. 1 we have shown a window construction in which four glass sheets or panes 1 are provided. The glass panes or sheets constitute a pair of outer panes 1a, 1b and two inner panes 1c, 1c. Between the outer panes 1a and 1b there is provided an outer spacer 2 while an inner spacer 3 is disposed between the panes 1c and 1c.

The inner spacer 3 is disposed exclusively between the inner panes 1c and 1d and is sandwiched therebetween and held in place by a wrapping band 4 extending around the outer flanks of the assembly formed by the inner panes 1c, 1d and the spacer 3. The wrapping band 4 overlies the faces of the inner panes 1c, 1d confronting the outer panes 1a and 1b. The thickness of this band 4 is represented at $d$ and corresponds to the spacing $a$ desired between each inner pane 1c or 1d and the proximal outer pane 1a or 1b. This distance is, as previously mentioned, between 0.3 and 2 mm and is preferably about 0.5 mm.

The inner spacer 3 is porous as is the band 4 and, on its side turned toward the space between the panes 1c and 1d is profiled or ridged to increase the acoustic installation peoperties thereof. Spacer 3 is composed of fiber glass containing or fiber glass reinforced synthetic resin while the outer spacer 2 is composed of metal.

The outer spacer 2 is constituted as a tubular profile with its side 2a turned toward the spacer 3 being perforated so as to be moisture permeable. Within the outer spacer 2 we provide a drying agent 5, e.g. calcium chloride, which maintains the space between the panes 1c and 1d moisture-free.

The desired spacing A (5 to 25 mm) between the inner panes is determined by the outer dimension E of the wrapping 4. The width B of the outer spacer 2 is smaller than this dimension E and the resulting space between the outer flanks of spacer 2 and the inner faces of pane 1a and 1b is filled with an adhesive 6 which is moisture impermeable.

Figure 2:
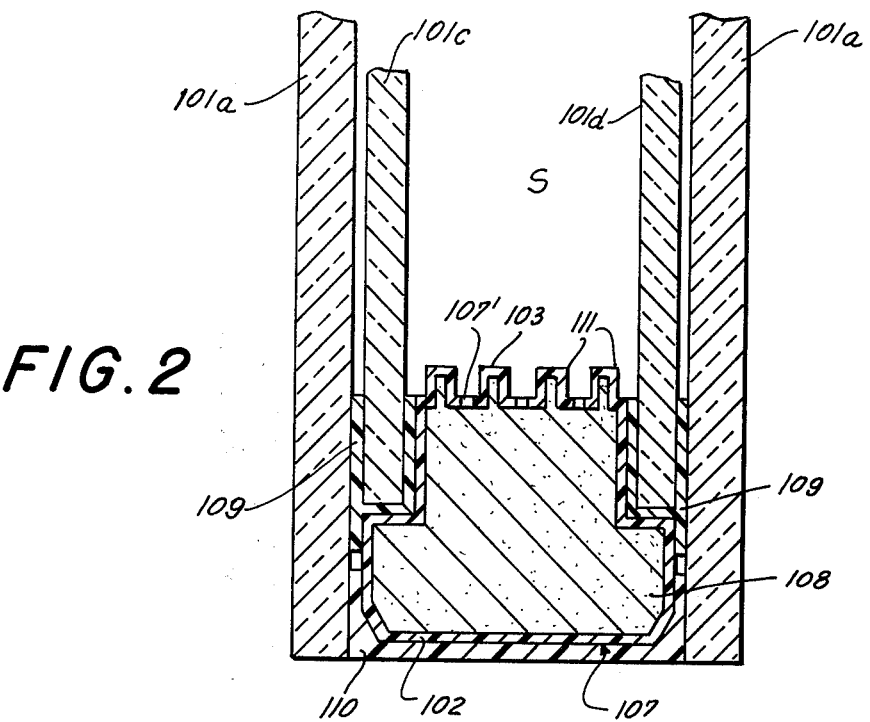
FIG. 2 is a cross-sectional view through a modification thereof.

In the embodiment illustrated in FIG. 2, the spacer portion 102 and the spacaer portion 103 form a unitary spacer profile 107 in which only the portion 103 lies between the inner panes 1c and 1d. The spacer 107 is constituted of synthetic resin, preferably polyvinyl chloride containing glass fibers of reinforced with fiber glass. The portion 107' turned toward the space S between the inner panes 101c and 101d is porous or perforated so as to be moisture permeable while other sides are water impermeable. A drying agent 108 is here disposed within the hollow profile so that the spaces between the glass panes may be kept dry. The profile 107 may be provided with a metal-foil coating or, as shown in FIG. 3, subdivided to form a pocket for the drying agent.

The gaps between the inner panes 101c, 101d and the confronting outer panes 101a, 101b may be defined by h-shaped individual profiles 109 mounted to straddle the edge of each inner pane. Between the outer panes 101a, 101b and the outer spacer portion 102, an adhesive 110 is provided to constitute the desired outer bond. While the adhesive has been shown to terminate short of the members 109, it should be noted that it may also bond to these members. A profile or ridge construction 111 is formed in the spacer 107 to improve the acoustic absorption properties thereof.

Figure 3:
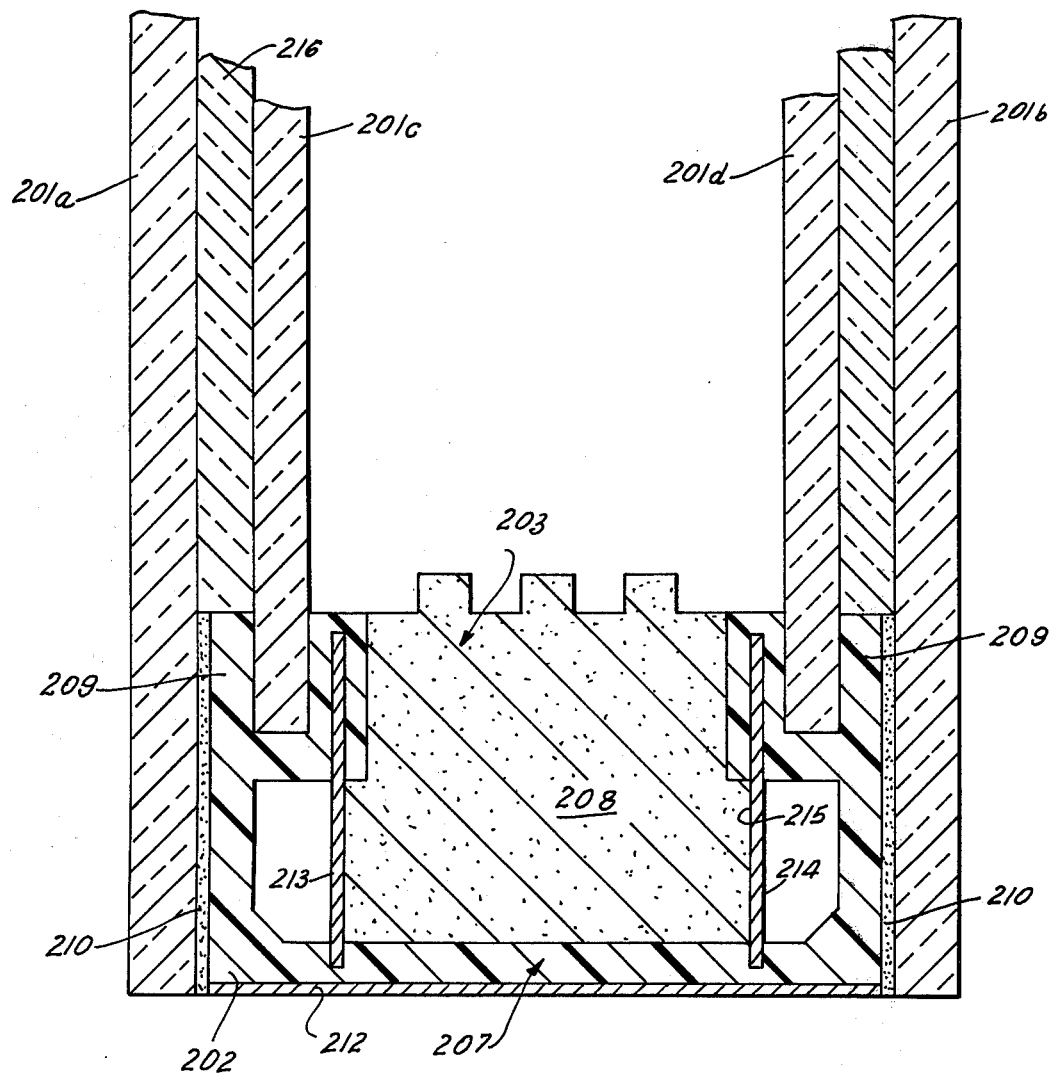
FIG. 3 is a view similar to FIG. 2 but illustrating a variation of this system.

In FIG. 3, we have shown another embodiment of the invention in which the spacer 207 has an outer spacer portion 202 defining the distance between the outer panes 201a and 201b which are bonded to the outer spacer portion by adhesive layers 210. In this embodiment, the spacer portion 203 separating the inner panes 201c and 201d is constituted by h-shaped formations 209 formed directly upon the member 207. The latter is extruded with an aluminum foil coating 212 and with a pair of foil partitions 213 and 214 which define a compartment 215 in which a block 208 of the drying agent is received. The foil, of course, may extend around the drying agent and can be perforated to allow access of moisture from the space between the inner panes to the latter. The block may be contoured to provide sound-deadening formations or the latter may be molded into the spacer 207. A layer 216 is provided between each outer pane and the proximal inner pane and consists of a sound-deadening synthetic resin which is transparent and of a thickness of, say, 0.5 mm.

Figure 4:
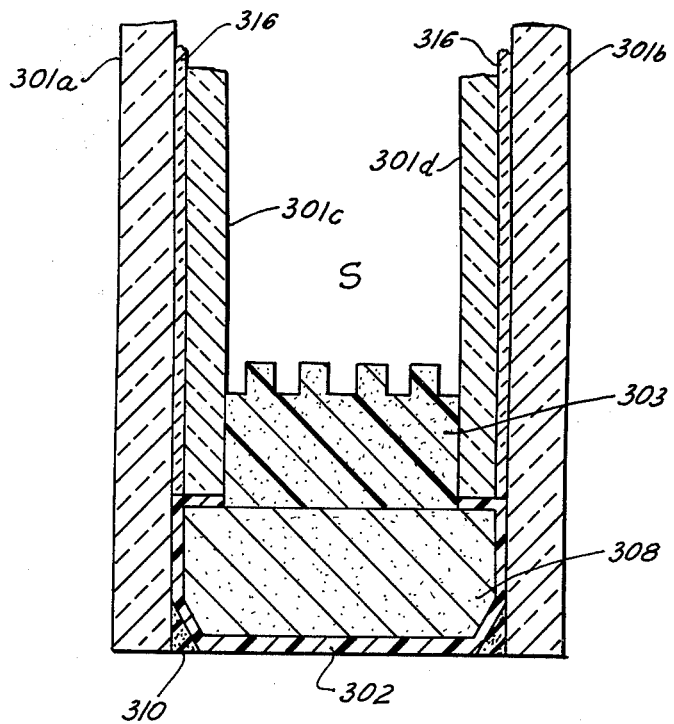
FIG. 4 shows still a further modification of the system of FIG. 2.

FIG. 4 shows a modification of the system of FIG. 2 in which the moisture-permeable synthetic-resin block 303 is provided between the inner panes 301c and 301d which are juxtaposed with the outer panes 301a and 301b. Transparent foils 316 are provided between the inner and outer panes and the outer spacer 302 is bonded to the outer panes by adhesive 310. The entire side of the outer spacer turned toward the space S is open and a body 308 of a drying agent is received therein.

We claim:

1. A multipane window structure comprising a pair of coextensive spaced-apart transparent outer panes;
   an inner transparent pane spaced from and parallel to each outer pane and closer to the respective outer pane than to the other inner pane;
   a layer of transparent sound-damping material disposed between each inner pane and the respective outer pane and filling the gap between each respective inner and outer pane;
   spacer means sealingly retaining said panes relative to one another and closing the edges of said structure, said spacer means comprising a generally U-section body having a pair of shanks and a bight bridging the space between said outer panes, said shanks being bounded along their outer surfaces to inner faces of said outer panes and being formed, remote from said bight, with inwardly lying channels open away from the bight and respectively receiving edge portions of the respective inner panes, said channels and said shanks together defining an h-profile; and
   a moisture-absorption member received between said shanks.

2. The structure defined in claim 1 wherein said body is composed of polyvinyl chloride.

3. The structure defined in claim 1 wherein said body is composed of a material containing glass fibers.

4. The structure defined in claim 1 wherein said body is composed of a synthetic resin having a layer of aluminum coating said bight and is formed with a pair of aluminum sheets extending between said channels and said bight.

* * * * *